US008090735B2

(12) United States Patent
Bireley et al.

(10) Patent No.: US 8,090,735 B2
(45) Date of Patent: Jan. 3, 2012

(54) STATEMENT GENERATION USING STATEMENT PATTERNS

(75) Inventors: William Robert Bireley, Morgan Hill, CA (US); Delmar Eugene Blevins, Los Gatos, CA (US); Stephen Andrew Brodsky, Los Gatos, CA (US); Curt Lee Cotner, Gilroy, CA (US); Anshul Dawra, San Jose, CA (US); Swaminathan Gounder, San Jose, CA (US); Daya Vivek, San Jose, CA (US); Maryela Evelin Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 11/767,454

(22) Filed: Jun. 22, 2007

(65) Prior Publication Data

US 2008/0320013 A1 Dec. 25, 2008

(51) Int. Cl.
*G06F 17/30* (2006.01)
(52) U.S. Cl. ...................................................... 707/759
(58) Field of Classification Search .................. 707/3–6, 707/759, 999.004, 999.005
See application file for complete search history.

(56) References Cited

U.S. PATENT DOCUMENTS

| | | | |
|---|---|---|---|
| 5,701,400 A | 12/1997 | Amado | |
| 5,754,858 A | 5/1998 | Broman et al. | |
| 6,353,820 B1 | 3/2002 | Edwards et al. | |
| 6,473,768 B1 | 10/2002 | Srivastava et al. | |
| 6,496,833 B1 | 12/2002 | Goldberg et al. | |
| 6,594,653 B2 * | 7/2003 | Colby et al. | 707/3 |
| 6,629,094 B1 * | 9/2003 | Colby et al. | 707/4 |
| 7,072,983 B1 | 7/2006 | Kanai et al. | |
| 7,076,772 B2 | 7/2006 | Zatloukal | |
| 7,137,100 B2 | 11/2006 | Iborra et al. | |
| 7,350,192 B2 * | 3/2008 | Seitz et al. | 717/108 |
| 7,516,128 B2 * | 4/2009 | Colby et al. | 707/4 |
| 7,725,460 B2 * | 5/2010 | Seitz et al. | 707/719 |

(Continued)

FOREIGN PATENT DOCUMENTS

EP 1251423 10/2002

OTHER PUBLICATIONS

Charles Z. Mitchell, "Engineering VAX Ada for a Multi-Language Programming Environment", ACM SIGSOFT/SIGPLAN software engineering symposium on Practical software development environments, 1987, pp. 49-58.

Thomas C. Hartrum and Robert P. Graham, Jr., "The AFIT Wide Spectrum Object Modeling Environment: An Awsome Beginning", Proceedings of the IEEE 2000 National Aerospace and Electronics Conference, pp. 35-42, Oct. 10-12, 2000.

(Continued)

*Primary Examiner* — Debbie Le
(74) *Attorney, Agent, or Firm* — Patterson & Sheridan, LLP

(57) ABSTRACT

Provided are techniques for generating a result set. A statement that includes at least one statement pattern is received, wherein each statement pattern is a template that indicates how a statement is to be modified for execution against a data store and wherein each statement pattern modifies program logic and control flow. Each statement pattern is expanded to generate one or more new statements, wherein each statement pattern is capable of being expanded to zero or more statement patterns. The one or more new statements are executed against a data store to obtain a result set. It is determined whether to modify the result set based on the at least one statement pattern. In response to determining that the result set is to be modified, modifying the result set.

24 Claims, 6 Drawing Sheets

U.S. PATENT DOCUMENTS

| | | | |
|---|---|---|---|
| 2002/0059444 A1 | 5/2002 | Shinno | |
| 2003/0074358 A1 | 4/2003 | Sarbaz et al. | |
| 2004/0078470 A1 | 4/2004 | Baumeister et al. | |
| 2004/0267690 A1 | 12/2004 | Bhogal et al. | |
| 2005/0114771 A1 | 5/2005 | Piehler et al. | |
| 2005/0120014 A1* | 6/2005 | Deffler | 707/4 |
| 2005/0160104 A1 | 7/2005 | Meera et al. | |
| 2005/0182758 A1* | 8/2005 | Seitz et al. | 707/3 |
| 2005/0256907 A1 | 11/2005 | Novik et al. | |
| 2005/0278270 A1 | 12/2005 | Carr et al. | |
| 2006/0112067 A1 | 5/2006 | Morris | |
| 2006/0179027 A1 | 8/2006 | Bechtel et al. | |
| 2007/0011651 A1 | 1/2007 | Wagner | |
| 2008/0162445 A1* | 7/2008 | Ghazal | 707/4 |
| 2008/0172360 A1* | 7/2008 | Lim et al. | 707/3 |
| 2008/0222129 A1* | 9/2008 | Komatsu et al. | 707/5 |

OTHER PUBLICATIONS

Robert A. Ballance et al., "The Pan Language-Based Editing System for Integrated Development Environments", SIGSOFT'90 Proceedings of the Fourth ACM SIGSOFT Symposium on Software Development Environments, Dec. 3-5, 1990, pp. 77-93, vol. 15 No. 6, Irvine, California.

Maarit Harsu et al., "A Language Implementation Framework in Java", Object-Oriented Technology, ECOOP'97 Workshop Reader, Lecture Notes in Computer Science, Jun. 9-13, 1997, pp. 141-144, vol. 1357, Jyvaskyla, Finland.

Azadeh Ahadian et al., "Rapid Application Development for Database-Aware Applications", U.S. Appl. No. 11/741,644, filed Apr. 27, 2007.

Azadeh Ahadian et al., "Extensible Rapid Application Development for Disparate Data Sources", U.S. Appl. No. 11/767,497, filed Jun. 23, 2007.

* cited by examiner

STATEMENT GENERATION USING STATEMENT PATTERNS

BACKGROUND

1. Field

Embodiments of the invention relate to statement generation using statement patterns.

2. Description of the Related Art

Relational DataBase Management System (RDBMS) software uses a Structured Query Language (SQL) interface. The SQL interface has evolved into a standard language for RDBMS software and has been adopted as such by both the American National Standards Institute (ANSI) and the International Standards Organization (ISO).

RDBMS uses relational techniques for storing and retrieving data in a relational database. Relational databases are computerized information storage and retrieval systems. Relational databases are organized into tables that consist of rows and columns of data. The rows may be called tuples or records or rows. A database typically has many tables, and each table typically has multiple records and multiple columns.

SQL is an ANSI/ISO standard language that users can utilize to create, retrieve, update, and delete data that resides in relational databases. SQL is commonly used by applications in order to interact with relational databases. A majority of SQL queries are similar in their structure and format, varying only in predicates or number of parameters. These variations occur due to a variety of factors, including optimistic concurrency control, paging (e.g., retrieving a first page or some other page in a set of pages), and conditional logic. Under an optimistic concurrency control scheme, locks are obtained immediately before a read operation and released immediately afterwards and update locks are obtained immediately before an update operation and held until the end of the transaction. Conditional logic refers to a WHERE clause in SQL statement (e.g., a user has two SQL statements with the same columns in the SELECT list but with a different number of host variables in the WHERE clause).

By itself, SQL lacks portability (i.e., the same SQL query might not work against different databases). One reason for the lack of portability in SQL is that some relational database vendors either do not follow the SQL standard or do not incorporate the entire standard. Another reason for lack of portability in SQL is that relational database vendors may choose to implement certain features of SQL differently because the SQL standard is not explicit in certain areas. These issues force an application programmer to write slightly different versions of an original SQL query in order to satisfy the syntactic requirements of each relational database the SQL query is supposed to run against.

Some cross-platform applications utilize string concatenation to build different flavors of the same original SQL query at runtime. The main drawback of this technique is that it leaves no room for static execution. Static execution requires that a statement is available prior to the runtime so that the statement can be prepared and bound to the database. If String concatenation is used, the actual String is only available at runtime, thereby leaving no room for static execution. Building different flavors may be described as building multiple SQL queries out of an original SQL query, where each of the SQL queries is compatible with a different RDBMS version (i.e., each of the multiple SQL statements is a flavor). Preparing and binding the SQL statement may be described as processing the SQL statement to get an access plan and registering the statement and access plan with the database.

Thus, application programs have the daunting task of writing one variation of the original SQL query for each relational database that the SQL query needs to run against. That is, application programmers are forced to learn various flavors and quirks of several flavors of SQL. The task of learning several SQL flavors not only presents a steep learning curve for the application programmers, but also makes it hard for the application programs to test these SQL queries.

Moreover, application programmers must learn enough about the various options and flags for several flavors of SQL in order to write a correctly functioning and optimal SQL query for that particular relational database. This approach of manually modifying the original SQL query to fit the requirements imposed by each relational database is also not optimal due to the reason that each and every customized SQL query must change if the original SQL query changes.

Thus, there is a need in the art for improved generation of SQL queries.

SUMMARY OF EMBODIMENTS OF THE INVENTION

Provided are a method, computer program product, and system for generating a result set. A statement that includes at least one statement pattern is received, wherein each statement pattern is a template that indicates how a statement is to be modified for execution against a data store and wherein each statement pattern modifies program logic and control flow. Each statement pattern is expanded to generate one or more new statements, wherein each statement pattern is capable of being expanded to zero or more statement patterns. The one or more new statements are executed against a data store to obtain a result set. It is determined whether to modify the result set based on the at least one statement pattern. In response to determining that the result set is to be modified, modifying the result set.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

A statement pattern may be described as a template that can be used to generate new artifacts or to modify existing artifacts. An artifact may be described as a statement (e.g., an SQL statement) and a result set returned from the data store 170*a* . . . 170*n* when the statement is executed. The template may be described as indicating how a statement is to modified before execution against a data store 170*a* . . . 170*n* and/or how result sets from executing the statement are to be modified before being returned. Embodiments enable application programmers to define generic statement patterns that allow application programs to customize, modify, and enhance a statement (e.g., an SQL query) according to syntactic and optimization requirements of an underlying relational database (a type of data store). These pre-defined statement patterns may be applied to the original statement during development or at runtime to enable the statement to be modified so that the statement can be executed against different relational databases. A statement pattern may modify both program logic (i.e., how to execute those statements at runtime) and control flow (i.e., what statements to execute at runtime). Also, the statement pattern may modify the program logic and one or more statements simultaneously.

Figure 1:
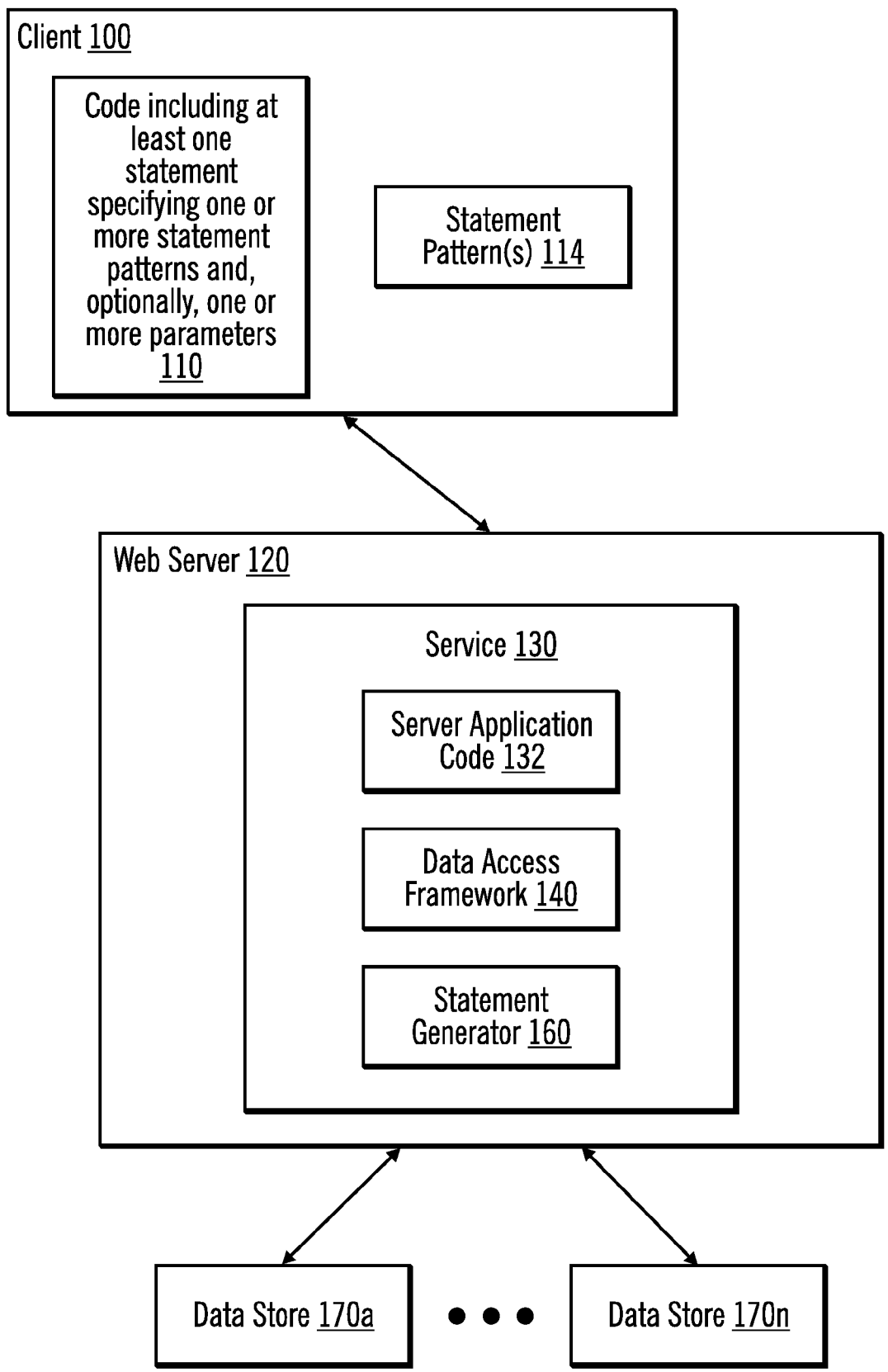
FIG. 1 illustrates details of a computing architecture in accordance with certain embodiments.

FIG. 1 illustrates details of a computing architecture in accordance with certain embodiments. In certain embodiments, client 100 and Web server 120 are on a single computing machine. In alternative embodiments, client 100 and Web server 120 are on different computing machines. A client 100 is coupled to a Web server 120. The client 100 includes code including at least one statement specifying one or more statement patterns 114 and, optionally, one or more parameters 110. Each statement may be an SQL statement, such as a query (i.e., a SELECT statement), an insert, an update, a delete or other type of SQL statement. The parameters may be part of the statement pattern 114, part of the statement or passed in as arguments to a method on which the statement is defined.

The client 100 also includes one or more statement patterns 114. The statement patterns 114 may include pre-defined statement patterns 114 from a developer and newly added statement patterns 114 from a user. The newly added statement patterns 114 may be versions of the pre-defined statement patterns 114 that have been extended (e.g., modified).

The Web server 120 includes a service 130. A service 130 may be described as providing some capability. A service may also be described as a piece of application code that can be remotely invoked over a network by a client application or by another service. For example, the service 130 may be a web service (e.g., provide a stock quote or a list of red toys) or a Representational State Transfer (REST) service. A REST service may be described as one in which information content is retrieved from a Web site by invoking a service that returns an XML file that describes and includes the information content. In certain embodiments, the service 130 is a stateless data access service (i.e., the service 130 provides data access to a data store 170a ... 170n such that objects are read and stored in different transactions).

The service 120 includes server application code 132, a data access framework 140, and a statement generator 160. The server application code 132 executes to respond to a client request. A data access framework 140 may be described as a set of pre-built classes and their instances that collaborate with the application code to retrieve and store data from and to the data stores 170a ... 170n. A data access framework 140 may also be described as providing an abstraction that allows executing statements (e.g., SQL statements) against a data store 170a ... 170n to retrieve result sets.

The statement generator 160 is invoked by the data access framework 140 to rewrite a received statement that includes at least one statement pattern. The statement generator 160 returns one or more statements to the data access framework 140 for execution.

The computer 100 and Web server 120 may each comprise any computing device known in the art, such as a server, mainframe, workstation, personal computer, hand held computer, laptop telephony device, network appliance, etc.

In certain embodiments, the client 100 and Web server 120 are coupled via a network. The network may comprise any type of network, such as, for example, a peer-to-peer network, spoke and hub network, Storage Area Network (SAN), a Local Area Network (LAN), Wide Area Network (WAN), the Internet, an Intranet, etc.

The Web server is coupled to data stores 170a ... 170n (where "a" and "n" and the ellipses are used to indicate that any number of data stores may be coupled to the Web server 120). In certain embodiments, each data store 170a ... 170n is a relational database. In certain embodiments, each of the data stores 170a ... 170n may be a different RDBMS and may be capable of executing a different flavor of an SQL statement. Each data store 170a ... 170n may comprise an array of storage devices, such as Direct Access Storage Devices (DASDs), Just a Bunch of Disks (JBOD), Redundant Array of Independent Disks (RAID), virtualization device, etc.

Embodiments enable the definition of statement patterns 114 that allow users to execute statements and perform result set augmentation. Result set augmentation may be described as modifying the result sets (e.g., mapping a result set to a particular data structure or adding a column to the result set). Use of statement patterns 114 is flexible, extensible, and provides users with the option to extend existing statement patterns 114 or to add new statement patterns 114. Statement patterns 114 allow users to map a result set returned from a data store 170a ... 170n to any abstract data structure. In this manner, users can provide metadata that is used for mapping via the use of statement patterns 114. Statement patterns 114 not only modify the existing statement but also allow the result set of executing the statement to be modified in a way that the user wants. Embodiments allow users to specify statements and result set modification with one statement pattern 114.

Multiple scenarios can benefit from the use of these statement patterns 114. Example scenarios are discussed herein merely to enhance understanding of the invention.

During the application of statement patterns 114, parameters may be added to or removed from the original statement. As an example, parameters for page number and page size may be added due to the application of a paging pattern 114. A paging pattern 114 allows users to fetch one page of data at a time from the data store 170a ... 170n instead of fetching an entire result set.

Similarly, the application of an optimistic concurrency pattern 114 may add a combination of previous values, timestamps, row modification counts, or row identifiers as parameters to the original statement.

Other statement patterns 114 include name alias patterns 114 that enable users to specify different names or column metadata. Metadata patterns 114 avoid the use of statement (e.g., query) metadata during development or at runtime by providing the metadata that describes the statement. Metadata that describes the statement is especially useful when different database systems return incomplete or inconsistent metadata for the same statement. A decomposition pattern 114 allows users to convert a query on a view, or a complex query into a modification statement to the underlying tables.

Statement patterns 114 themselves may be parameterized in order to enable grouping of various functions into a single statement. As an example, a paging pattern 114 may have two forms: (1) a getFirstPageByValue form or (2) a getAnyPageByValue form. The getFirstPageByValue form is optimized for the first page, whereas the getAnyPageByValue may deal with random access to pages. When a statement pattern 114 is parameterized, embodiments are able to identify which pattern 114 should be executed based on parameter values.

Although, examples herein may refer to SQL statements, however, embodiments may be used with various types of statements (e.g., statements written in other languages, including XQuery, XPath, and XUpdate).

As an example, consider query (1), which may be written by an applications developer using statement patterns:

| Query (1) |
|---|
| data.query("SELECT A, B, C FROM T WHERE D=?hostvariable ORDER BY A {pageByValue(?startingA, ?numrows)}", hostvariable , startingA, numRows). |

Query (1) has a core SQL statement "SELECT A, B, C FROM T WHERE D=?hostvariable ORDER BY A" with a pageByValue pattern 114. The query (1) also includes parameters: hostvariable, startingA, and numRows. The pageByValue pattern 114 includes a parameter startingA, which indicates the page number to start at, and a parameter numRows, which indicates a number of rows to be returned in a result set when the SQL statement is executed. In this example, the pageByValue pattern 114 expands to the following logic (1) (however, the pageByValue pattern 114 may include different logic in different embodiments).

| Logic (1) |
|---|
| if (startingA=1)<br>   query("select a, b, c from t where d=?hostvariable order by a // {getFirstPageByValue (?numRows)}", hostvariable, numRows)<br>else<br>   query("select a, b, c from t where d=?hostvariable order by a // {getAnyPageByValue (?startingA, ?numRows)}", hostvariable, startingA, numRows) |

In logic (1), if the parameter startingA has a value is equal to one, then the first page is retrieved, otherwise, a particular page is retrieved. In particular, logic (1) includes getFirstPageByValue and getAnypageByValue patterns 114.

The getFirstPageByValue pattern 114 and getAnypageByValue pattern 114 of logic (1) expand to the following logic (2):

| Logic (2) |
|---|
| if (startingA=1)<br>   query("select a, b, c from t where d=?hostvariable order by a fetch first ?numRows only", hostvariable, numRows)<br>else<br>   query("select a, b, c from t where d=?hostvariable and a>=?startingA order by a fetch first ?numRows only", hostvariable , startingA, numRows) |

In logic (2), if the parameter startingA has a equal to one, then, the query "select a, b, c from t where d=?hostvariable order by a fetch first ?numRows only" is executed, otherwise, the query" select a, b, c from t where d=?hostvariable and a>=?startingA order by a fetch first ?numRows only" is executed).

As can be seen from logic (1) and logic (2), both program logic and control flow (i.e., how to execute those statements and what statements to execute at runtime) may be modified based on a statement pattern. Also, the statement pattern may modify the program logic and statements simultaneously (e.g., the "if . . . else" statement is program logic and the "select" statements are the statements in logic (2)).

Thus, statement patterns 114 may be applied recursively to SQL queries. Additionally, statement patterns 114 may be applied recursively to output result sets (e.g., as will be described below with reference to Query (4)—tableAlias pattern).

In the case of static SQL, the expanded queries are registered together (i.e., prepared and bound to the data store 170$a$ . . . 170$n$, thus locking an access path), thus, optimizing query execution. The appropriate SQL query is then executed based on the parameters.

Use of statement patterns 114 allow actual statements (e.g., SQL statements) to be generated at compile time. Thus, allowing statements to be prepared and statically bound to the data store 170$a$ . . . 170$n$.

The application of statement patterns 114 is also useful when a number of parameters is not known, but is based on a number of possible input parameter combinations. This scenario is explained further in the following example query (2).

| Query (2) |
|---|
| data.query("select a, b, c from t where a=?a and b in ({params(2, 4)})", a, b1, b2, b3) |

Query (2) uses the params pattern 114 (i.e., a parameters pattern) to expand the original SQL query. The params pattern 114 indicates that the number of parameters may range from 2-4 parameters. Query (2) is based on the number of parameters passed in. The params pattern 114 expands to the following logic (3):

| Logic (3) |
|---|
| if number of parameters = 2<br>   query("select a, b, c from t where a=?a and b in (?)", a, b1)<br>else if number of parameters = 3<br>   query("select a, b, c from t where a=?a and b in (?, ?)", a, b1, b2)<br>else<br>   query("select a, b, c from t where a=?a and b in (?, ?, ?)", a, b1, b2, b3) |

In certain embodiments, the statement patterns 114 may be specific to a database vendor or a database version. As an example, DB2® Universal Database V9 (DB2 is a trademark of International Business Machines Corporation in the United States, other countries, or both) uses two columns for optimistic concurrency control. On the other hand, other databases may use one column for optimistic concurrency control. With embodiments, users can utilize the unique features of a relational database with statement patterns 114 that are specific to that relational database.

The statement patterns 114 carry the option to switch to data store-specific statements either at runtime or at the time of generation. Generation may be described as creating an implementation for the interface at compile or post compile time. For example, a statement pattern 114 may be used to generate two queries at the time of compilation. The type of database connectivity at runtime may then be used to decide which query should be executed.

The ability of the statement patterns 114 to allow the grouping of several statements helps eliminate many cases of dynamic SQL assembly using string concatenation. That is, the SQL statement is available at runtime when strings are concatenated to form the SQL statement. This helps improve performance and system management.

Statement patterns 114 may also be combined (e.g., sequentially). As an example, consider a user who has a base table and a history table. The difference between these two tables is their name. Without the use of statement patterns 114, a user would need to write multiple queries in order to fetch data from both the tables. However, with the use of table replacement and column replacement patterns, a user can write a single core query, but still be able to fetch data from both the base table and the history table.

The following query (3) provides an example of using the table and column replacement patterns.

---
Query (3)

@Select ("Select * from EMPLOYEE", pattern=TableReplacementPattern (switch, "EMPLOYEE", "MYEMPLOYEE", ColumnPattern("*.name", "com.acme.Employee.h_name"), ColumnPattern ("*.id", "*.Employee.id*")
public Iterator<Employee> foobar (boolean);

---

Query(3) expands to the following logic (4) when foobar( ) is called:

---
```
if (switch == true) {
data.query(Select * from EMPLOYEE)
}
else {
data.query(Select * from MYEMPLOYEE)
}
```
---

For this example, assume that the following is a Bean Definition of Employee (where Bean refers to a Java® class that conforms to a Java® Bean Specification (Java is a trademark of Sun Microsystems in the United States, other countries, or both):

---
```
package com.acme;
Class Employee{
public String h_name;
public int id;
}
```
---

When mapping the column values for logic (4), the columnPattern pattern 114 maps the "name" column from MyEmployee table to the property "h_name" in the Employee bean. But, the column "id" column from the Employee table or MyEmployee table is mapped to the "id" property in the bean. In certain embodiments, the name from Employee table is not mapped.

Another example of a pattern 114 is a tableAlias pattern 114, which is illustrated in Query (4).

---
Query (4)

@Select(sql = "select * from employee, person", pattern = "tableAlias (employee => atest.EmployeeBean, h_employee => atest.EmployeeBean)")
Iterator<ast.EmployeeBean> getEmployees ( );

---

The tableAlias pattern 114 is expanded to generate code to map all the columns returned from employee table to bean atest.EmployeeBean.

The following Query (5) provides an example for result set augmentation:

---
@Select (sql="Select street, apptno, zipcode from address" pattern=QOC("SELECT cityname from :listOfCityNames where zip=?"))
getAddress(List listOfCityNames)

---

In Query (5), for every address returned from the data store 170a . . . 170n, the data access framework 140 adds a column "cityname" to the result set. For query (5), the data access framework 140 queries the city names from the list of city names at the client using zipcode as a key.

Figure 2:
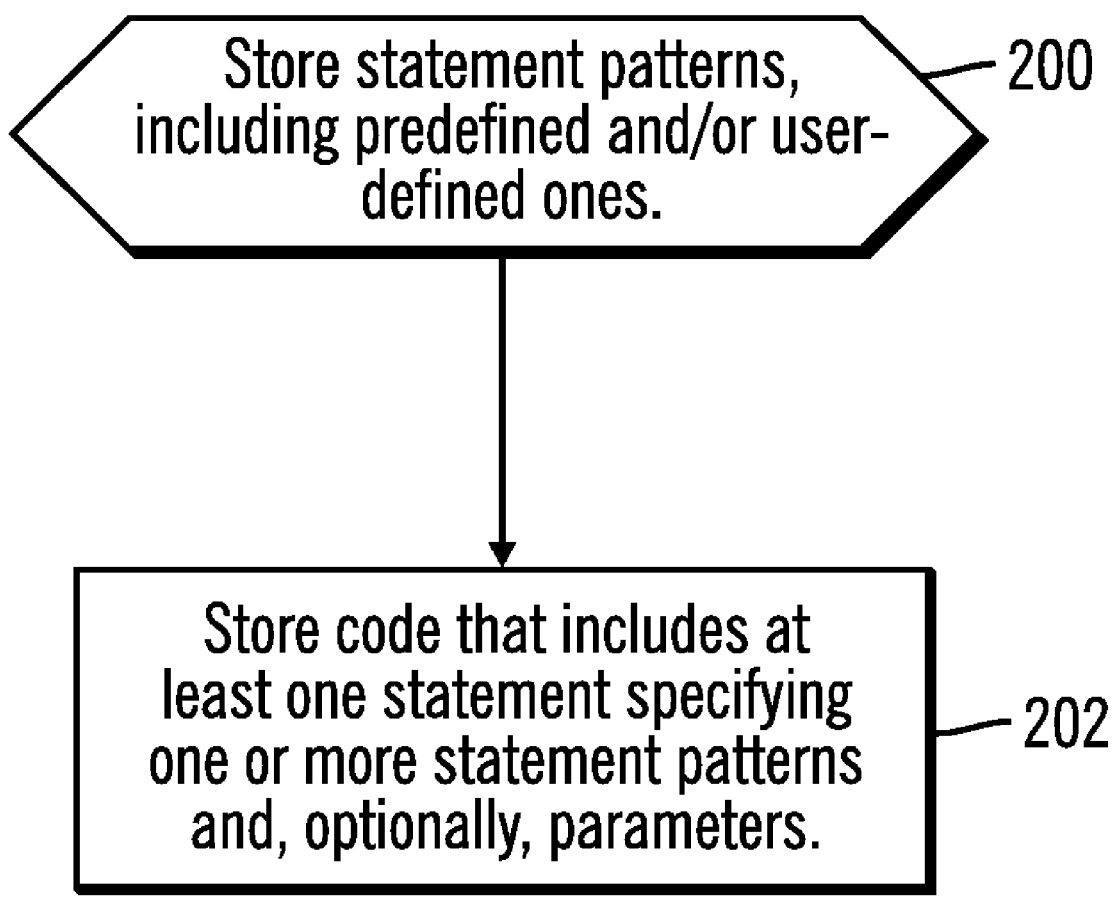
FIG. 2 illustrates logic in accordance with certain embodiments.

FIG. 2 illustrates logic in accordance with certain embodiments. Control begins at block 200 with statement patterns 114 being stored. The statement patterns 114 include one or both of pre-defined and user-defined statement patterns. In block 202, code 110 that includes at least one statement (e.g., a SQL statement) specifying one or more statement patterns is stored. Either the statement or the statement pattern or both may include one or more parameters.

Figure 3A:
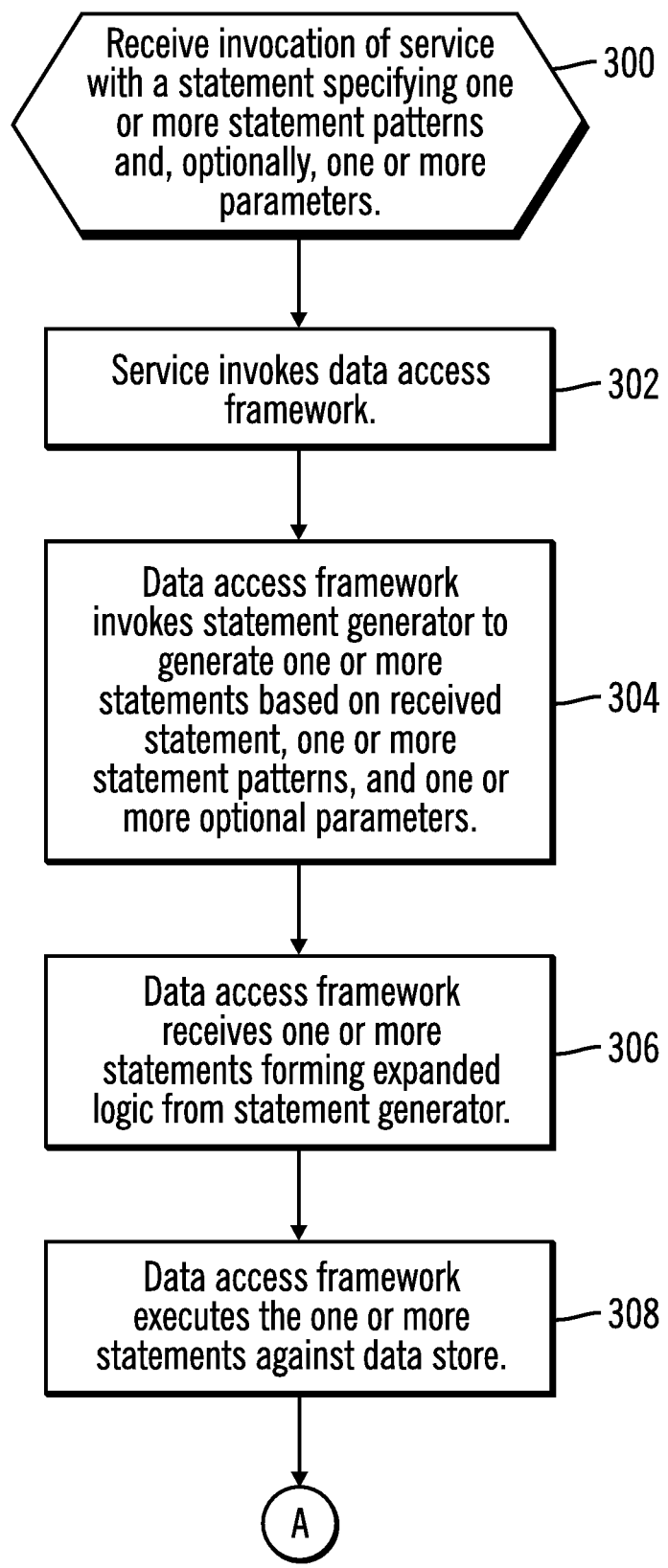
FIGS. 3A and 3B illustrate logic for generating a result set in accordance with certain embodiments.
Figure 3B:
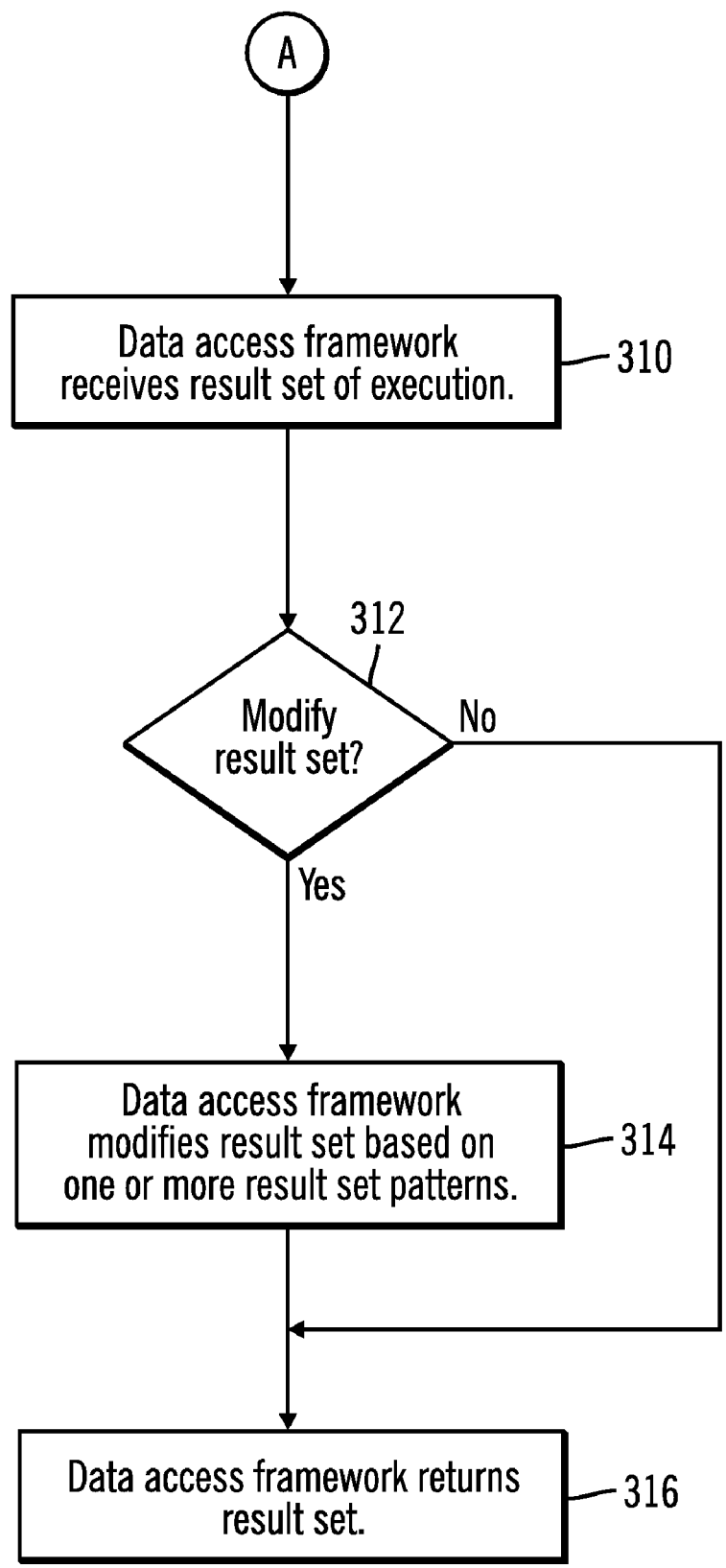

FIGS. 3A and 3B illustrate logic for generating a result set in accordance with certain embodiments. Control begins at block 300 with the service application code 132 receiving invocation of the service 130 from a client application 110. The invocation includes a statement specifying one or more statement patterns 1114, and, optionally, one or more parameters. In block 302, the service application code 132 invokes the data access framework 140. In block 304, the data access framework 140 invokes the statement generator 160 to generate one or more statements based on the received statement, the one or more statement patterns 114, and the one or more optional parameters. The one or more statements may be generated at compile time or at run time. In block 306, the data access framework 140 receives the one or more statements forming expanded logic from the statement generator 160. In block 308, the data access framework 140 executes the one or more statements using the parameter values (e.g., the parameter values may indicate how many parameters are to be used, as was described in Query (2)) against a data store 170a . . . 170n. From block 308 (FIG. 3A), processing continues to block 310 (FIG. 3B). In block 310, the data access framework receives a result set of the execution. In block 312, the data access framework 140 determines whether the result set is to be modified based on the at least one pattern. For example, if a result set pattern was received with the invocation of the service 130, then the result set is modified based on that result set pattern. If so, processing continues to block 314, otherwise, processing continues to block 316. In block 314, the data access framework 140 modifies the result set based on one or more result set patterns (each of which may include zero or more parameters). For example, the modification may include mapping the result set to a particular data structure or adding a column to the result set. From block 314, processing continues to block 316. In block 316, the data access framework 140 returns the result set (e.g., to the client 100 or the code 110).

Figure 4:
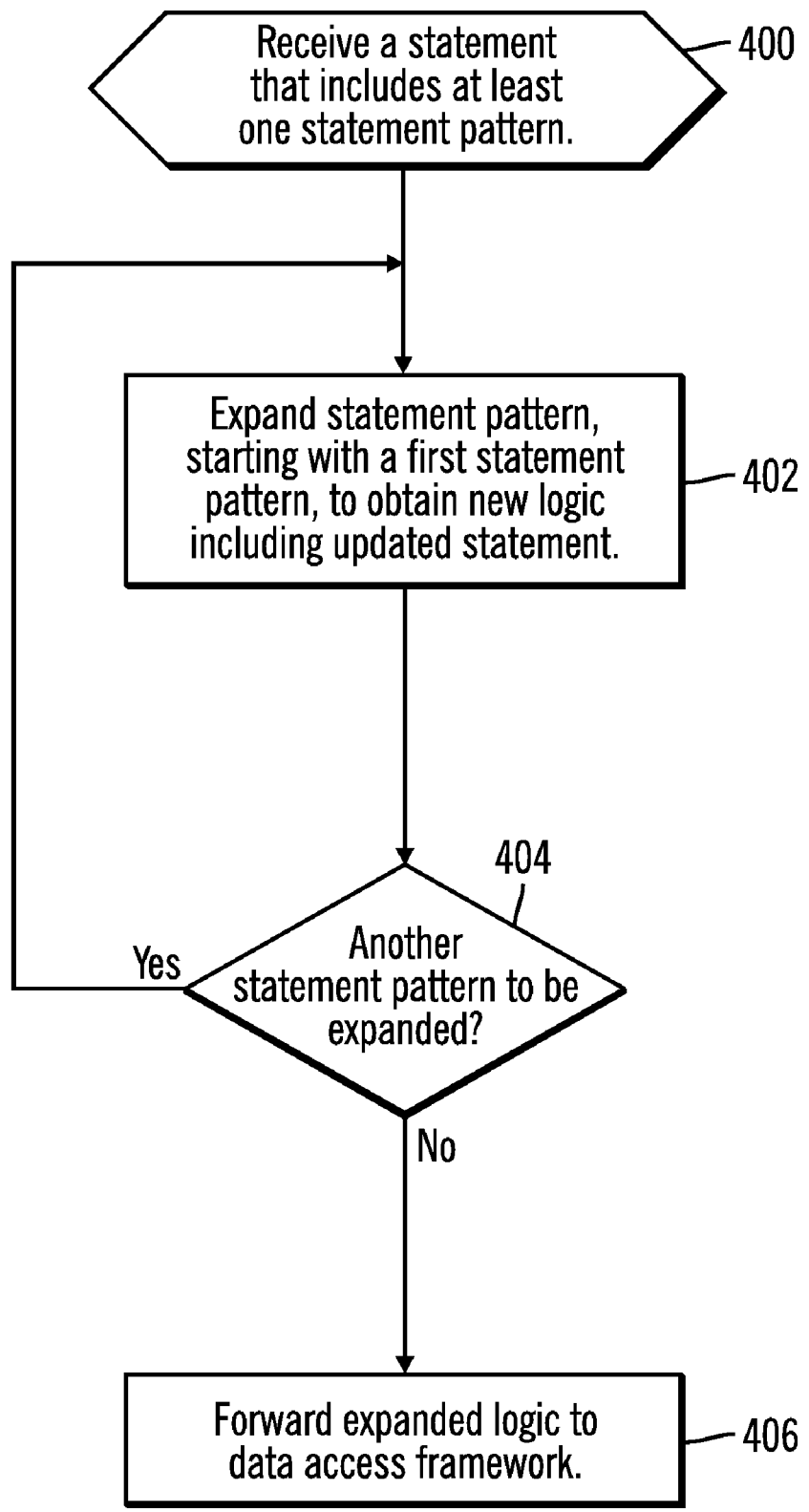
FIG. 4 illustrates logic performed by a statement generator in accordance with certain embodiments.

FIG. 4 illustrates logic performed by the statement generator 160 in accordance with certain embodiments. In block 400, the statement generator 160 receives a statement that includes at least one statement pattern 114. In block 402, the statement generator 160 expands a statement pattern 114, starting with a first statement pattern 114, to obtain new logic, including an updated statement. In particular, the statement generator 160 rewrites a received statement that includes a statement pattern 114. The statement generator 160 uses the statement pattern 114 as a hint to enhance the one or more statements that are generated.

In block 404, the statement generator 160 determines whether there is another statement pattern 114 to be expanded. It is possible that the expanded logic includes additional statement patterns 114 to be expanded. If there are additional statement patterns 114 to be expanded, processing loops back to block 402, otherwise, processing continues to block 406. In block 406, the statement generator 160 forwards the expanded logic to the data access framework 140.

Thus, embodiments provide an application side solution for optimization and rewrite of queries.

The expressive power of the statement patterns 114 are designed to replace a statement with one or more new statements, and to allow a program set up previously to execute new statements without affecting the rest of the program.

Statement patterns 114 may be specified inside or outside the core statement. Also, any number of statement patterns 114 may be applied together to any number of statements.

The use of statement patterns 114 is not limited to queries. Statement patterns 114 are highly versatile, and may be applied to all types of statements, such as insert, update, and delete statements. Statement patterns 114 may also be applied to queries written in other languages, including XQuery, XPath, and XUpdate.

Embodiments of statement patterns 114 may include generation framework devices as input and mechanisms for the statement syntax trees and the source code. In certain embodiments, the generation framework device takes as an input an interface with a method annotated with SQL and a pattern. The generation framework device processes the SQL and the pattern and generates code for execution.

Embodiments enable various versions of an original SQL query to be optimized, as well as executed, as static SQL. Static SQL performs better and is more secure than dynamic SQL, which requires preparing and binding the SQL statement for execution at run time. Also, embodiments use statement patterns 114 that allow the application of SQL and result set augmentations and enhancements (e.g., a pagyByValue pattern).

Embodiments eliminate the duplicate existence of several versions of the same original statement generated in order to satisfy syntactic and optimization requirements of various underlying relational databases. The use of statement patterns 114 also enables the adoption of best practices. For example, developers (or other experts) may write statement patterns 114 so that users do not need to worry about the logic, thus, easing the burden of learning several underlying technologies on application programmers and users. With the use of the statement patterns 114, the application programmers and users only need to learn how to select the appropriate and applicable statement patterns 114 in order to tailor the original statement to the syntactic requirements of a specific relational database. The use of these statement patterns 114 also helps ease the workloads of testing on application programmers since the statement patterns 114 can be tested, before production use, during development, by the pattern provider.

Thus, embodiments integrate statement patterns with statement generation.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2, 3A, 3B, and 4 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2, 3A, 3B, and 4 may be implemented in software, hardware, programmable and non-programmable gate array logic or in some combination of hardware, software, or gate array logic.

Figure 5:
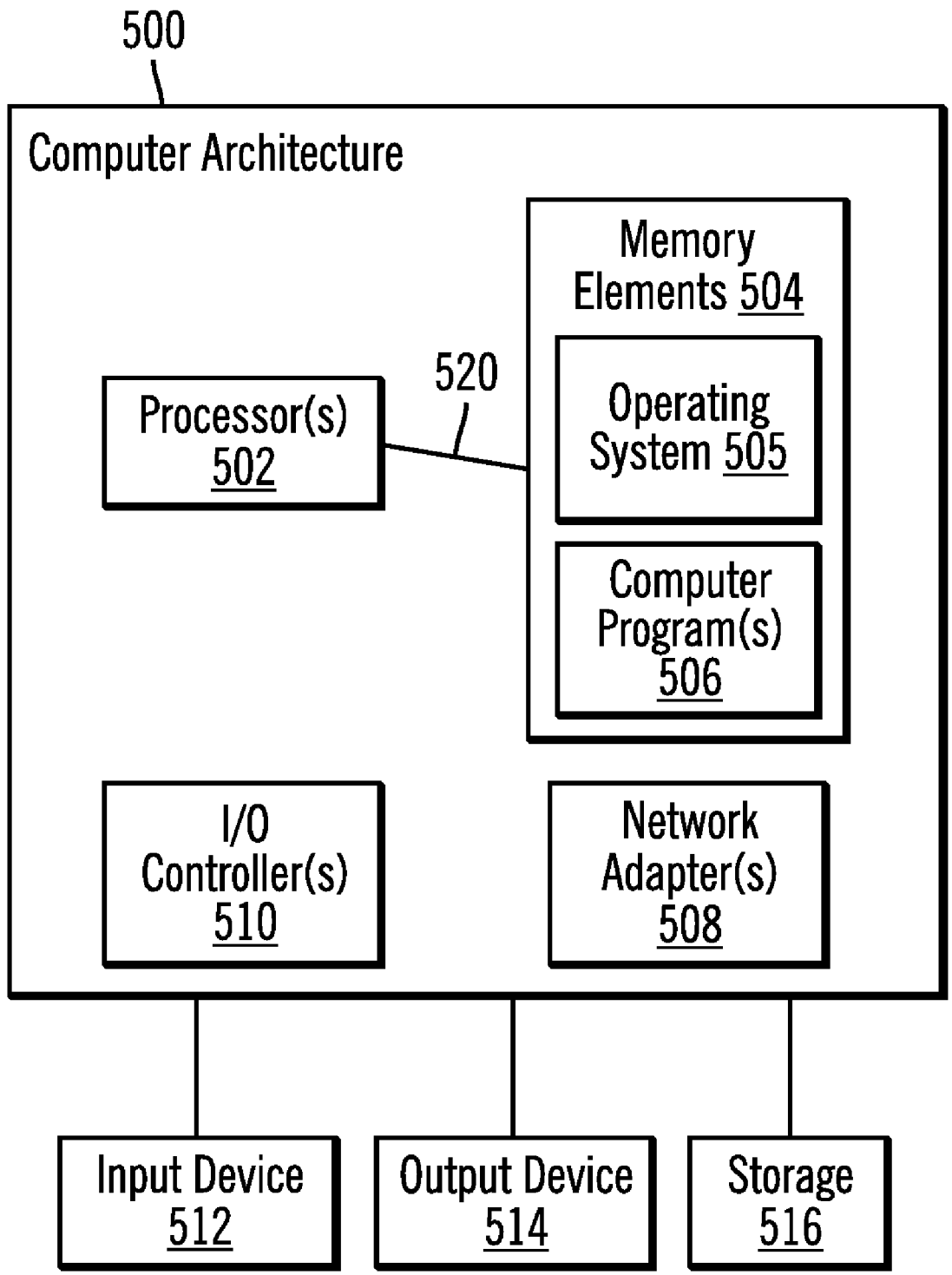
FIG. 5 illustrates a system architecture that may be used in accordance with certain embodiments.

FIG. 5 illustrates a system architecture 500 that may be used in accordance with certain embodiments. Client 100 and/or Web server 120 may implement system architecture 500. The system architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The system architecture 500 may be coupled to storage 516 (e.g., a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The system architecture 500 may include fewer components than illustrated, additional components not illustrated herein, or some combination of the components illustrated and additional components. The system architecture 500 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
generating a query statement by expanding a base query statement using at least one query fragment of a plurality of query fragments and by operation of one or more computer processors, wherein each query fragment of the plurality of query fragments specifies a distinct way of expanding the base query statement, wherein the at least one query fragment is selected using a parameter value, wherein the base query statement is expanded by a statement generator using the at least one query fragment, and wherein the statement generator is invoked under control of a data access service; and
executing the generated query statement against a data store to obtain a result set.

2. The method of claim 1, wherein the parameter value is used when the query statement is executed.

3. The method of claim 1, wherein the base query statement comprises one of a SELECT, INSERT, UPDATE, and DELETE statement.

4. The method of claim 1, further comprising:
receiving a statement pattern that specifies the plurality of query fragments and associates each of the plurality of query fragments with a distinct parameter value.

5. The method of claim 1, wherein each query fragment corresponds to a different type of data store.

6. The method of claim 1, wherein the base query statement is provided as an input to the data access service, and wherein a data access framework is invoked under control of the data access service.

7. The method of claim 1, further comprising mapping the result set to a data structure.

8. The method of claim 1, wherein the query statement is expressed in a query language, wherein each query fragment comprises a distinct keyword from the query language, wherein the query statement does not include the parameter value, and wherein the method further comprises:
receiving a statement pattern that specifies the plurality of query fragments and associates each of the plurality of query fragments with a distinct parameter value.

9. The method of claim 8, wherein each of the plurality of query fragments specifies a distinct way of expanding the base query statement for execution against a data store.

10. The method of claim 9, further comprising:
determining whether to modify the result set based on the statement pattern; and
upon determining that the result set is to be modified, modifying the result set based on the statement pattern.

11. A computer program product comprising a computer useable storage medium including a computer readable program, wherein the computer readable program when executed on a computer causes the computer to:
generating a query statement by expanding a base query statement using at least one query fragment of a plurality of query fragments, wherein each query fragment of the plurality of query fragments specifies a distinct way of expanding the base query statement, wherein the at least one query fragment is selected using a parameter value, wherein the base query statement is expanded by a statement generator using the at least one query fragment, and wherein the statement generator is invoked under control of a data access service; and
executing the generated query statement against a data store to obtain a result set.

12. The computer program product of claim 11, wherein the parameter value is used when the query statement is executed.

13. The computer program product of claim 11, wherein the base query statement comprises one of a SELECT, INSERT, UPDATE, and DELETE statement.

14. The computer program product of claim 11, wherein the computer readable program further causes the computer to:
   receiving a statement pattern that specifies the plurality of query fragments and associates each of the plurality of query fragments with a distinct parameter value.

15. The computer program product of claim 11, wherein each query fragment corresponds to a different type of data store.

16. The computer program product of claim 11, wherein the base query statement is provided as an input to the data access service, and wherein a data access framework is invoked under control of the data access service.

17. The computer program product of claim 11, wherein the computer readable program further causes the computer to map the result set to a data structure.

18. A system, comprising:
   one or more computer processors capable of performing operations, the operations comprising:
      generating a query statement by expanding a base query statement using at least one query fragment of a plurality of query fragments, wherein each query fragment of the plurality of query fragments specifies a distinct way of expanding the base query statement, wherein the at least one query fragment is selected using a parameter value, wherein the base query statement is expanded by a statement generator using the at least one query fragment, and wherein the statement generator is invoked under control of a data access service; and
      executing the generated query statement against a data store to obtain a result set.

19. The system of claim 18, wherein the parameter value is used when the query statement is executed.

20. The system of claim 18, wherein the base query statement comprises one of a SELECT, INSERT, UPDATE, and DELETE statement.

21. The system of claim 18, wherein the operations further comprise:
   receiving a statement pattern that specifies the plurality of query fragments and associates each of the plurality of query fragments with a distinct parameter value.

22. The system of claim 18, wherein each query fragment corresponds to a different type of data store.

23. The system of claim 18, wherein the base query statement is provided as an input to the data access service, wherein a data access framework is invoked under control of the data access service.

24. The system of claim 18, wherein the operations further comprise mapping the result set to a data structure.

* * * * *